United States Patent Office 3,560,173
Patented Feb. 2, 1971

3,560,173
ADDITIVE FOR GAS TURBINE, JET PROPULSION AND DIESEL ENGINE FUELS
Richard C. Coffey, Baden, Pa., and Richard L. Smith, Atlanta, Ga., assignors to Lockheed Aircraft Corporation, Burbank, Calif.
No Drawing. Filed Dec. 9, 1966, Ser. No. 600,392
Int. Cl. C10l 1/02
U.S. Cl. 44—56         4 Claims

ABSTRACT OF THE DISCLOSURE

The addition of from 1 to 10 percent of N-propyl alcohol to aviation fuels prevents the separation from the fuel of both the dissolved and the suspended water. Gas turbine, jet propulsion, and like fuels normally contain 15 to 30 parts per million of suspended water and approximately 75 parts per million dissolved water. In-flight cooling and vibration causes the coalescence of this water and it accumulates in the bottom of the tank where it promotes the growth of microorganisms and the corrosion of aircraft structure. The addition of the N-propyl alcohol to the fuel prevents the separation of this water from the fuel and the consequent damage to the aircraft structure.

---

This invention relates broadly to engine fuels and more particularly to an additive for gas turbine, jet propulsion and diesel engine fuels wherein polar solvents are employed to prevent the separation and precipitation of water from the fuel.

The engine fuels contemplated herein are the volatile fuels which have a 90% distillation temperature of from about 450° F. to 600° F. and are commonly referred to as kerosene and diesel fuels. The presence of moisture in these fuels has been a particular problem in, although not limited to, the operation of aircraft. This is due largely to the fact that the amount of free water, i.e., water not dissolved in the fuel, present is a function of temperature, and aircraft experiences an extremely broad temperature range during normal operation which conceivably can extend from 150° F. to −85° F. within a relatively short time.

The aircraft industry has become reconciled to a standard of 15 p.p.m. (parts per million) of allowable free water in jet fuel. However, over the temperature range of 0° F. and 100° F., for example, there is approximately 1 part water in solution per million parts fuel for each degree F. Roughly translated, this means that about 40 p.p.m. of additional water will precipitate in the tank during a typical flight due to the in-flight cooling of the relatively warm fuel. In addition, normal flight vibrations cause coalescence of the water thus formed; and it settles to the bottom of the tank where it accumulates, serving among other things as the solvent for the electrolytes which cause corrosion of the fuel system.

Prior attempts to alleviate the above conditions through more sophisticated fuel handling techniques prior to introduction of the fuel into the aircraft have not been successful. Where additives have been heretofore proposed, these, so far as they relate to water and fuel at all, have been intended to dissolve in the water layer or phase to prevent its freezing and not to prevent its separation in solution with fuel.

Also, additives have been suggested which propose to prevent the accumulation of water in the fuel system by producing an emulsion causing a dispersion of the water particles and a protective or insulating coating around each minute particle of water separating it from other such particles and the fuel. This scheme is limited principally to automotive as opposed to aircraft applications inasmuch as under the relatively severe buffeting and vibrating of aircraft such fuel mixture becomes unstable. In addition, this scheme is limited to use in gasoline where the density is much less than water as compared with fuel as herein contemplated.

The present invention is therefore directed to an additive for kerosene and diesel fuels which contain the proper hydrophobic-hydrophilic properties to prevent the separation of water from the fuel and which has particular utility in the aircraft application. The discrete molecules of both the fuel and water are thereby locked in intimate and inseparable engagement. At the same time, this additive must not increase the solubility of the water to a detrimental level with respect to the overall combustion characteristics of the fuel mixture.

Since hydrocarbon fuels were the subject of the investigation, it was felt that the ultimate additive most effective in increasing the water retentive property would be one which was soluble in the fuel and would be able to bind the water to the fuel. The concept was that the fuel and water molecules would be locked together by hydrogen bonds by means of an alcohol moiety. Polar solvents which exihibit hydrogen bonding were thought to meet these qualifications.

In order to determine the most efficient additive, different polar solvents were compared selecting those that exhibit hydrogen bonding, such as alcohols and ketones. Illustrative examples of solvents tested and the results are set forth as follows in Table I:

TABLE I

| Sample | JP-4 to H₂O Ratio | Solvent | Water in JP-4 (parts per million) |
|---|---|---|---|
| 1. 75.0 ml. JP-4, 20.0 ml. H₂O, 5.0 ml. solvent | 3.7:1 | N-N-dimethylaniline | 20.0 |
| | | Methyl ethyl ketone | 43.0 |
| | | N-propyl alcohol | 413.0 |
| | | N-butyl alcohol | 983.0 |
| | | 3-pentyl alcohol | 886.0 |
| | | Iso-butyl alcohol | 662.0 |
| | | N-amyl alcohol | 867.0 |
| | | Ethylene glycol | 112.0 |
| 2. 200 ml. JP-4, 45.0 ml. H₂O, 5.00 ml. solvent | 4.5:1 | N-propyl alcohol | 225.0 |
| | | N-butyl alcohol | 390.0 |
| | | N-amyl alcohol | 282.0 |
| | | N-octyl alcohol | 257.0 |
| 3. 100 ml. JP-4, .100 ml. H₂O, 1.00 ml. solvent | 1,000:1 | Iso-propyl alcohol | 273 |
| | | N-butyl alcohol | 239 |
| | | N-amyl alcohol | 193 |
| | | N-propyl alcohol | 275 |
| 4. 100 ml. JP-4, 2.00 ml. H₂O, 4.00 ml. solvent | 50:1 | Ethyl alcohol | 280 |
| | | N-propyl alcohol | 1,008 |

In these tests, the fuel used was JP-4, and the precise water content in each sample was determined by using Karl Fischer reagent with 50% (volume) methanol-methylene chloride as a solvent. These samples were run on a Beckman KF-3 Aquameter which gives an electrometric endpoint of the Karl Fischer titration. The moisture content of the samples was calculated in conventional manner using standard formulae.

These tests bore out the above theory concerning hydrogen bonding, and the aliphatic alcohols when added to the hydrocarbon fuel produced mixtures in which water was most soluble. The tests were so aimed as to show the best aliphatic alcohols to use with varying amounts of free water in the system. In these tests, quantities of JP-4, distilled water, and the different aliphatic alcohols were added to a flask to produce samples of two-phase systems, i.e., systems that include a layer of JP-4 and a layer of water. Table I illustrates some comparative figures obtained.

In sample 1, it can be seen that when the ratio of water to fuel was high N-butyl alcohol held much more water to the fuel than did N-propyl. The N-butyl in this case saturated the water to the limit of its solubility (7.9 grams in 100 grams of water) which left approximately 3.5 ml. still in the JP-4 to bind water. The N-propyl alcohol being very soluble in the water was largely extracted into the water layer.

In sample 2, this effect is further shown. Here the amount of water present is sufficient to extract all except 3% of the N-butyl alcohol, and therefore there is a corresponding drop in bound water. This effect is even more apparent in the case of the more insoluble N-amyl alcohol and N-octyl alcohol.

In the third sample, the amount of alcohol present in the fuel is the limiting factor; and, in this case, predictably the alcohol having the greatest solubility in water is able to bind the most water to fuel. Iso-propyl and N-propyl alcohol are both infinitely soluble in water and both bind equivalent amounts of water, the butyl and amyl alcohol being progressively less soluble bind proportionately lesser amounts.

Sample 4 shows that if you increase the solvent concentration to 4% (volume) an almost proportionate increase in water binding occurs in the case of N-propyl alcohol, while in the case of the shorter chain ethyl alcohol, no increase over the alcohols tested in the third sample occurs due to separation of the system into two phases because of ethyl alcohol's low affinity for fuel. In this application, ethyl alcohol is the equivalent of iso-propyl alcohol.

As indicated above, the solubility of N-butyl alcohol in water is 7.9 gm./100 ml. water; N-propyl alcohol is infinitely soluble in water. If identical samples of JP-4 and water were made and N-propyl alcohol and N-butyl alcohol were added to separate samples, we would find that because of their relative solubilities in water more alcohol would partition into the water phase in the N-propyl alcohol sample. However, when the concentration of water in fuel is 4,000 p.p.m. or less, such as encountered in aircraft operations, N-propyl alcohol readily binds this into a single phase fuel. No separation of a water layer or phase is encountered and no clouding of the fuel occurs. N-butyl alcohol on the other hand does not have the affinity for water as does N-propyl alcohol and binding of 100% of the free water does not occur.

It was, therefore, concluded that N-propyl alcohol is the desired solvent for water in the concentrations characteristic of fuel in aircraft. The percentage of N-propyl alcohol on a per volume basis needed to dissolve varying water content was then determined. The technique employed was to add increments of 0.05 ml. of water to the fuel. N-propyl alcohol was added with intermittent shaking. When the original 0.05 ml. of water was dissolved with a measured quantity of N-propyl alcohol, additional increments of water were added until the system was saturated for the quantity of alcohol present. This was recorded and additional quantities of alcohol and water were added to obtain the next data point. Brilliant green dye was used as an indicator to detect water. The dye is soluble in water and insoluble in JP-4. It was thus visibly evident when the water was dissolved. This method lacks the accuracy and precision of the electrometric titration and the results are not directly comparable; however, it does demonstrate that the N-propyl alcohol will dissolve all of the water present, within the range of interest, into a homogenous fuel-water-alcohol system.

The data thus obtained is set forth in Table II as follows:

TABLE II

| N-propyl alcohol in JP-4 (volume percent): | Water bound to JP-4 (parts per million) |
| --- | --- |
| 1.0 | 50 |
| 2.0 | 75 |
| 3.0 | 175 |
| 4.0 | 350 |
| 5.0 | 600 |
| 6.0 | 1100 |
| 7.0 | 1650 |
| 8.0 | 2300 |
| 9.0 | 3000 |
| 10.0 | 3800 |

From all of the foregoing data, it is concluded that N-propyl alcohol alone is capable of binding all of the water present to the JP-4 fuel in the range of water concentrations encountered in gas turbine engine operations. N-butyl alcohol and the longer chain alcohols exhibit only proportional binding having an increasing higher affinity for fuel with increasing chain length and a corresponding drop in water affinity. Iso-propyl alcohol and ones of shorter chain length are extracted by the water from the system, therefore causing a phase separation except at very low water concentrations.

In normal aircraft fuel, the free water content as delivered is usually less than 50 p.p.m. and only under extraordinary circumstances does it exceed 100 p.p.m. In-flight cooling of the fuel can increase this amount by 50 p.p.m. Condensation within a cold aircraft tank can contribute another 100 p.p.m. to the water load. From this, i.e., 3.0% (volume) N-propyl alcohol which binds 175 p.p.m. of water, it can be deduced that approximately 3.5% which would bind on the order of 250 p.p.m. is all that would normally be required. Abnormal water concentration of 600 p.p.m. can be readily handled by 5.0% N-propyl alcohol.

In non-aircraft applications, such as for example stationary turbine generators, as much as 10% (volume) N-propyl alcohol may be required. In situations where very clean fuels are used at essentially constant temperatures, only 1% (volume) N-propyl alcohol may be required in order to maintain a water-free system.

It is to be understood that the foregoing specific examples and data are set forth only by way of illustration and that the present invention is not thus limited but is subject only to the expressed limitations of the appended claims.

What is claimed is:

1. A jet engine fuel composition comprising a hydrocarbon aviation kerosene, and N-propyl alcohol at a concentration of between 1 and 10 percent by volume.

2. The composition of claim 1 wherein an alcohol concentration of approximately 3.5% by volume is employed.

3. The composition of claim 1 wherein said fuel contains a free water to fuel ratio of not more than .1% and said N-propyl alcohol is at a concentration of between 1 and 6 percent by volume.

4. The composition of claim 1 wherein said fuel contains a free water to fuel ratio of more than .1% and said N-propyl alcohol is at a concentration of between 6 and 10 percent by volume.

References Cited

UNITED STATES PATENTS

| | | | |
|---|---|---|---|
| 2,662,817 | 12/1953 | Russell et al. | 44—53 |
| 2,886,422 | 5/1959 | Vitalis et al. | 44—56 |
| 2,886,423 | 5/1959 | Vitalis et al. | 44—56 |
| 1,752,724 | 4/1930 | Bourie | 44—56 |
| 1,907,309 | 5/1933 | Schaack, Jr. | 44—56 |
| 12,987 | 5/1855 | Gesner | 44—56 |
| 2,646,348 | 7/1953 | Neudeck | 44—56 |

OTHER REFERENCES

"The Merck Index of Chemicals and Drugs," 6th Ed., 1952, page 546.

PATRICK P. GARVIN, Primary Examiner

MRS. Y. H. SMITH, Assistant Examiner